United States Patent [19]
Chainer et al.

[11] Patent Number: 5,901,003
[45] Date of Patent: May 4, 1999

[54] METHOD AND APPARATUS FOR DETERMINING SYSTEMATIC ERRORS

[75] Inventors: Timothy Joseph Chainer, Mahopac; Anthony Paul Praino, Poughquag; Mark Delorman Schultz, Elmsford; Bucknell C. Webb, Ossining; Edward John Yarmchuk, Somers, all of N.Y.

[73] Assignee: International Business Machines Corporation, Armonk, N.Y.

[21] Appl. No.: 08/628,910

[22] Filed: Apr. 8, 1996

Related U.S. Application Data

[62] Division of application No. 08/348,773, Dec. 1, 1994, abandoned.

[51] Int. Cl.$^6$ .................................................. G11B 5/09
[52] U.S. Cl. .......................... 360/51; 360/75; 360/77.08; 360/76
[58] Field of Search .................... 360/75, 77.04, 360/51, 77.05, 77.07, 77.08, 76

[56] References Cited

U.S. PATENT DOCUMENTS

| | | | |
|---|---|---|---|
| 5,229,901 | 7/1993 | Mallary | 360/77.02 |
| 5,416,652 | 5/1995 | Lewis | 360/51 X |
| 5,485,322 | 1/1996 | Chainer et al. | 360/51 |
| 5,570,247 | 10/1996 | Brown et al. | 360/75 |
| 5,581,420 | 12/1996 | Chainer et al. | 360/75 |
| 5,615,058 | 3/1997 | Chainer et al. | 360/51 |

FOREIGN PATENT DOCUMENTS

| | | | |
|---|---|---|---|
| 63-000872 | 6/1988 | Japan | G11B 21/10 |
| 4-023276 | 5/1992 | Japan . | |
| WO 94/11864 | 5/1994 | WIPO . | |

OTHER PUBLICATIONS

"Regenerative Clock Technique For Servo Track Writers," IBM Technical Disclosure Bulletin, vol. 33 No. 5, pp. 310–311 (Oct. 1990).

*Primary Examiner*—Andrew L. Sniezek
*Attorney, Agent, or Firm*—Monica D. Lee; Heslin & Rothenberg, P.C.

[57] ABSTRACT

Improvements in placement of timing patterns in self servo writing include correcting for random and systematic errors due to geometric effects. In a disk drive having a recording head with separate read and write elements, a method for determining separation between the elements and for correcting for such errors as a function of skew angle between the head and the disk. Errors resulting from misalignment and non-parallelism of the elements as well as misalignment of the head on it its actuator are also detected and corrected. Errors due to changes in rotational velocity of the disk and misplacement of timing patterns with respect to adjacent timing patterns are detected and corrected. In general, a single revolution process may be used to both write and detect random errors on each track and corrected on subsequent tracks.

22 Claims, 15 Drawing Sheets

FIG. 1a PRIOR ART
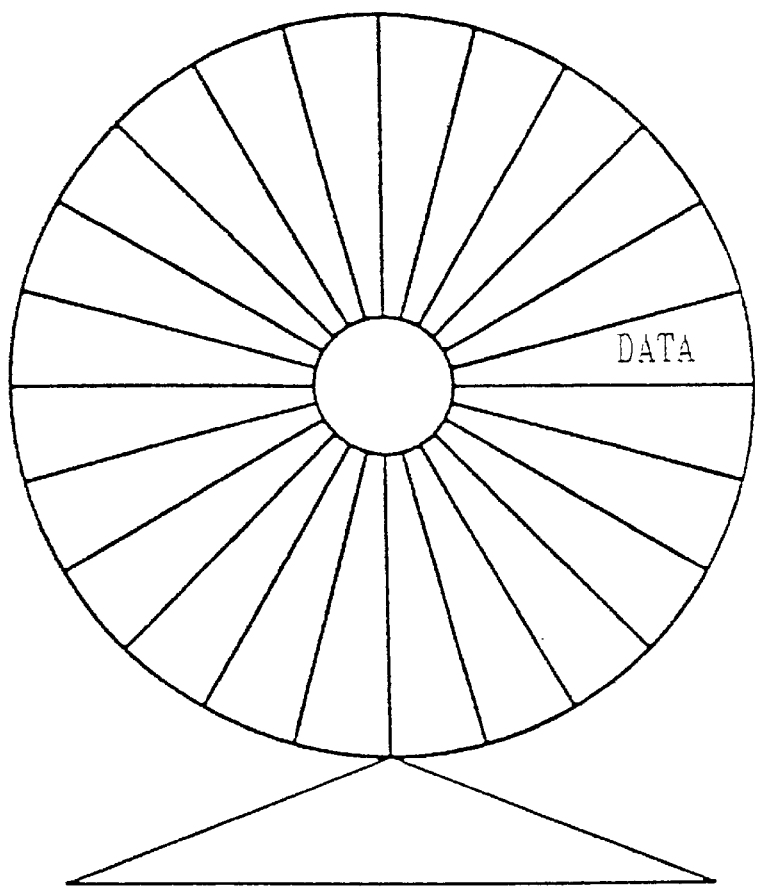
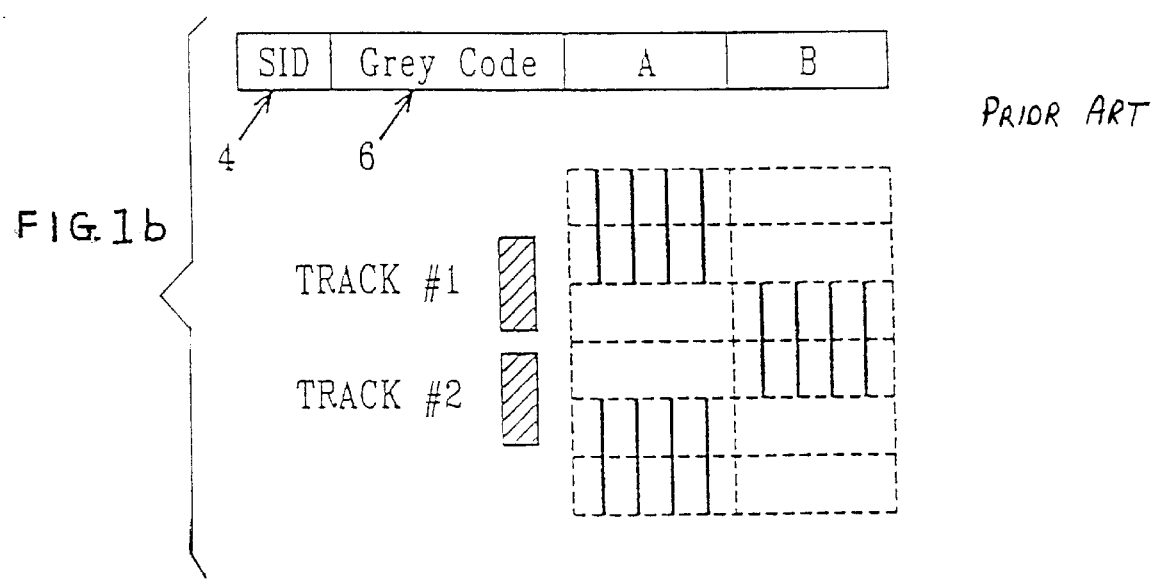
FIG. 1b PRIOR ART

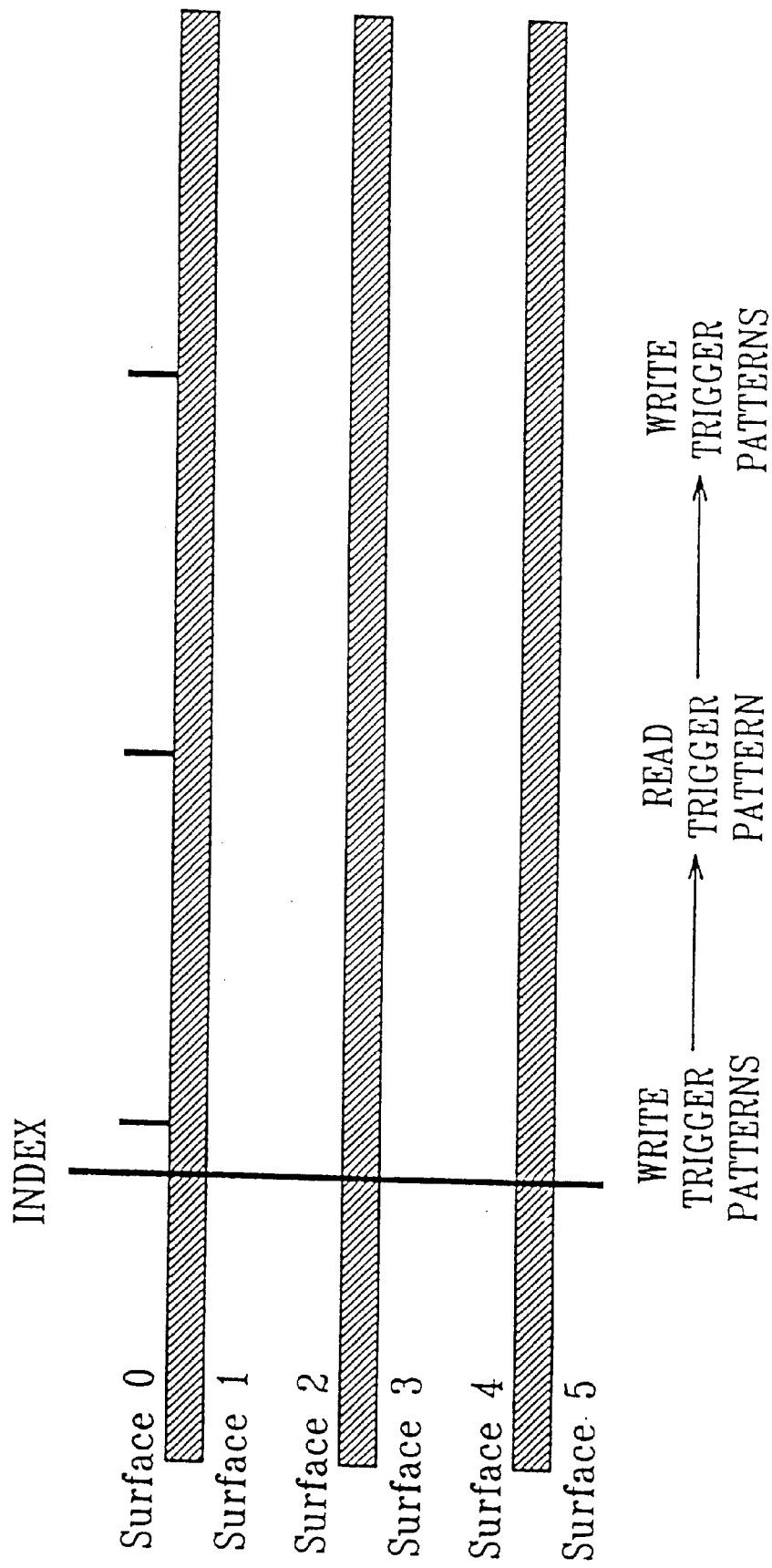

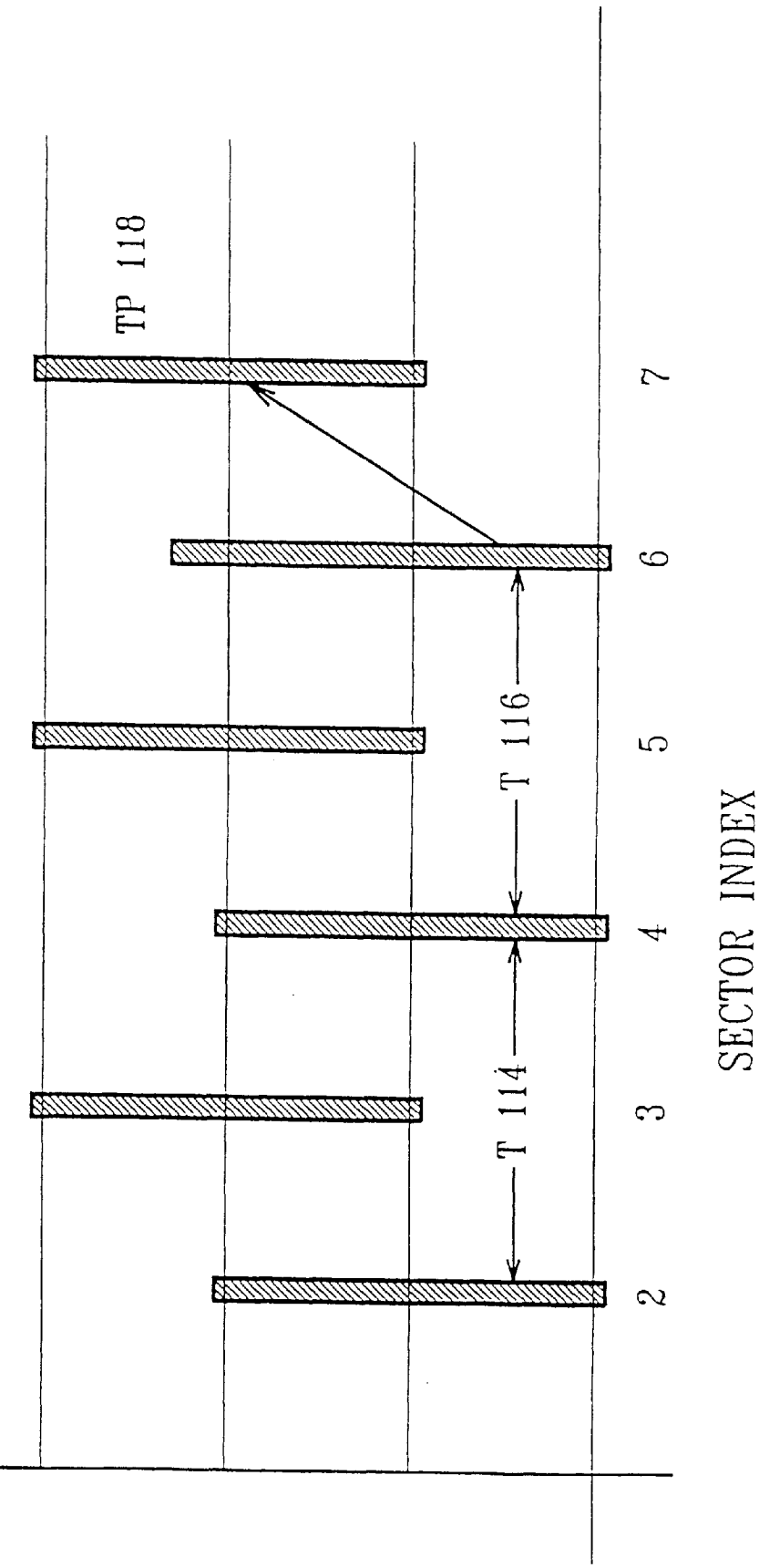

METHOD AND APPARATUS FOR DETERMINING SYSTEMATIC ERRORS

CROSS REFERENCE TO RELATED APPLICATION

This application is a division of application Ser. No. 08/348,773 filed Dec. 01, 1994 which application is now abandoned.

This application is related to U.S. patent application Ser. No. 08/028,044 of T. Chainer et al. filed on Mar. 8, 1993 entitled "A Method and System for Writing a Servo-Pattern on a Storage Medium" commonly assigned herewith, and incorporated herein by reference. It is also related to U.S. patent application Ser. No. 08/349,028 of E. Yarmchuk et. al., Attorney Docket No. Y0994-253, filed on Dec. 2, 1994 entitled "Radial Self-Propagation Pattern Generation For Disk F.6 Servowriting" herewith, and also incorporated by reference.

BACKGROUND OF THE INVENTION

Field Of The Invention

The invention relates generally to hard disk drive memory storage devices for computers. More particularly it relates to disk drive apparatus and to a method for writing servotrack information therein. More specifically it relates to alleviating the need for a complex mechanical and/or optical positioning system to establish servopatterns on the recording surfaces of the recording media.

Background Art

As described in International Patent Application, WO 94/11864, increased levels of storage capacity in floppy and hard disk drives are a direct result of the higher track densities possible with voice-coil and other types of servo positioners as well as the ability to read and write narrower tracks by using, for example, magnetoresistive (MR) head technology. Previously, low track density disk drives were able to achieve satisfactory head positioning with leadscrew and stepper motor mechanisms. However, when track densities become so great that the mechanical error of a leadscrew-stepper motor combination is significant compared to track-to-track spacing, an embedded servo is needed so that the position of the head can be determined from the signals it reads.

Conventional hard disk manufacturing techniques include writing servotracks on the media of a head disk assembly (HDA) with a specialized servowriter instrument. Laser positioning feedback is used in such instruments to read the actual physical position of a recording head used to write the servotracks. Unfortunately, it is becoming more and more difficult for such servowriters to invade the internal environment of a HDA for servowriting because the HDAs themselves are exceedingly small and depend on their covers and castings to be in place for proper operation. Some HDAs are the size and thickness of a plastic credit card. At such levels of microminiaturization, traditional servowriting methods are inadequate.

Conventional servo-patterns typically comprise short bursts of a constant frequency signal, very precisely located offset from a data track's center line, on either side. The bursts are written in a sector header area, and can be used to find the center line of a track. Staying on center is required during both reading and writing. Since there can be between seventeen to sixty, or even more, sectors per track, that same number of servo data areas must be dispersed around a data track. These servo-data areas allow a head to follow a track center line around a disk, even when the track is out of round, as can occur with spindle wobble, disk slip and/or thermal expansion. As technology advances to provide smaller disk drives, and increased track densities, the placement of servo data must also be proportionately more accurate.

Servo-data are conventionally written by dedicated, external servowriting equipment, and typically involve the use of large granite blocks to support the disk drive and quiet outside vibration effects. An auxiliary clock head is inserted onto the surface of the recording disk and is used to write a reference timing pattern. An external head/arm positioner with a very accurate lead screw and a laser displacement measurement device for positional feedback is used to precisely determine transducer location and is the basis for track placement and track-to-track spacing. The servo writer requires a clean room environment, as the disk and heads will be exposed to the environment to allow the access of the external head and actuator.

U.S. Pat. No. 4,414,589 to Oliver et al. teaches servowriting wherein optimum track spacing is determined by positioning one of the moving read/write heads at a first limit stop in the range of travel of the positioning means. A first reference track is then written with the moving head. A predetermined reduction number or percentage of amplitude reduction X %, is then chosen that is empirically related to the desired average track density. The first reference track is then read with the moving head. The moving head is then displaced away from the first limit stop until the amplitude of the first reference track is reduced to X % of its original amplitude. A second reference track is then written with the moving head and the moving head is then displaced again in the same direction until the amplitude of the second reference track is reduced to X % of its original value. The process is continued, writing successive reference tracks and displacing the moving head by an amount sufficient to reduce the amplitude to X % of its original value, until the disc is filled with reference tracks. The number of reference tracks so written is counted and the process is stopped when a second limit stop in the range of travel of the positioning means is encountered. Knowing the number of tracks written and the length of travel of the moving head, the average track density is checked to insure that it is within a predetermined range of the desired average track density. If the average track density is high, the disc is erased, the X % value is lowered and the process is repeated. If the average track density is low, the disc is erased, the X % valuers increased and the process is repeated. If the average track density is within the predetermined range of the desired average track density, the desired reduction rate X %, for a given average track density, has been determined and the servo writer may then proceed to the servo writing steps.

Unfortunately, Oliver et al. do not disclose how to generate a clock track using the internal recording data heads, as this is achieved by an external clock head. Oliver et al. also do not teach how to determine the track spacing during propagation. This results in the requirement of writing an entire disk surface and counting the number of written tracks to determine the track spacing. Further, Oliver et al. do not examine the variation in the plurality of heads within the disk drive to set the track pitch accordingly. Finally, Oliver et al. do not teach how to limit the growth of errors during the radial propagation growth. Random errors will grow as the square root of the number of steps, which for a disk drive propagation is on the order of 10,000 steps resulting in a final error 100 times larger than the step to step error.

As also described in International Patent Application WO94/11864, a method for writing a servo-pattern with a disk drive's own pair of transducers is described in U.S. Pat. No. 4,912,576, issued Mar. 27, 1990 to Janz. Three types of servo-patterns are used to generate three-phase signals that provide a difference signal having a slope that is directly proportional to velocity. Servo-patterns that are substantially wider radially than the nominal track-to-track separation are possible. This helps improve readback amplitudes, and thus servo performance. Janz observes that the signal level from a transducer is a measure of its alignment with a particular pattern recorded on the disk. If the flux gap sweeps only forty percent of a pattern, then the read voltage will be forty percent of the voltage maximum obtainable when the transducer is aligned dead-center with the pattern. Janz uses this phenomenon to straddle two of three offset and staggered patterns along a centerline path intended for data tracks.

In a preferred process, Janz reserves one side of a disk for servo and the other side for data. The disk drive includes two transducers on opposite surfaces that share a common actuator. To format an erased disk for data initialization, a first phase servo is written on the servo side at an outer edge. The transducers are then moved-in radially one half of a track, as indicated by the first phase servotrack amplitude, and a first data-track is recorded on the data side. The transducers are again moved-in radially one half of a track, this time as indicated by the first data-track amplitude, and a second phase servotrack is recorded on the servo side. The transducers are again moved-in radially one half of a track, as indicated by the second phase servotrack amplitude, and a second data-track is recorded on the data side. The transducers are moved-in radially another one half of a track, as indicated by the second data-track amplitude, and a third phase servotrack is recorded on the servo side. The transducers are moved-in radially one half of a track, as indicated by the third phase servotrack amplitude, and a third data-track is recorded on the data side. This back-and-forth progress is repeated until the entire two surfaces are written. If too few or too many tracks were thus written, the disk is reformatted once more, but with a slight adjustment to step inward slightly more or slightly less than one-half a track width, as appropriate. Once the disk drive has been formatted with an entire compliment of properly spaced servotracks, the data-tracks have served their purpose and are erased in preparation for receiving user data.

Unfortunately, the method described by Janz consumes one entire disk surface for servotracks and requires two heads working in tandem. Track-to-track bit synchronism is also not controlled, and seek times to find data between tracks would thus be seriously and adversely impacted. Transducer flying height variations and spindle runout that occur within a single revolution of the disk, and media inconsistencies can and do corrupt radial position determinations that rely on a simple reading of off-track read signal amplitudes. Prior art methods are inadequate for very high performance disk drives.

IBM Technical Disclosure Bulletin, Vol. 33, No. 5 (October 1990) entitled "Regenerative Clock Technique For Servo Track Writers" suggests servo writing of a head/disk assembly after the covers are in place by means of the product head and without the use of an external position encoder disk. A single clock track is written at the outer diameter and divided into alternate A and B phases. The head is than stepped inwards half a track at a time using each phase alternately as a source of clock information from which servo information in the servo sectors preceding each data field and further clock signals in the alternate phase can be written. The half track steps ensure that the previously written clock information can be read. The technique dispenses with a dedicated servo writer clock head and associated mechanisms.

International Patent Application No. WO94/11864 teaches a hard disk drive comprising a rotating disk with a recording surface, a transducer in communication with the surface and servo-actuator means for radially sweeping the transducer over the surface, a variable gain read amplifier connected to the transducer, an analog to digital converter (ADC) attached to the variable gain amplifier, an erase frequency oscillator coupled to the transducer for DC erasing of the disk surface, a memory for storing digital outputs appearing at the ADC, and a controller for signaling the servo-actuator to move to such radial positions that result in transducer read amplitudes that are a percentage of previous read amplitudes represent in the digital memory. Bit-synchronism between tracks is maintained by writing an initial clock track with closure and then writing a next clock track including a regular sequence of clock bursts a half-track space offset such that the initial clock track can be read in between writing clock bursts and the read signal is used to frequency-lock an oscillator which is used as a reference for the writing of clock bursts of the next track. A checkerboard pattern of clock bursts is thus created. All subsequent tracks are built incrementally by stepping off a half of a track from the last track written, which comprises clock bursts, and writing a next new sequence of clock bursts that interlace with the previous track's clock bursts.

Servo pattern writing in disk drives requires precise timing which is derived from the rotating disk storage medium to gate a pattern generator such as to create synchronism of the servo pattern from track to track. This precise timing is normally achieved by an external clock head or shaft encoder. The servo pattern shown in FIGS. 1a–1b includes a sector header followed by a pattern to provide radial position information. The sector is comprised of a Servo ID Field 4 and Grey Code Field 6 which require precise alignment track to track. Misalignment in these patterns results in destructive interference of the magnetic pattern and reduces the amplitude of the signal which leads to errors. Specifications on the alignment in modern disk drives is approximately 25 nanosec (3 sigma) track to track for a disk rotation period of roughly 11 milliseconds or 2.3 ppm. This narrow time window therefore requires precise measurement of the disk angular position over many revolutions of the disk.

Any process used to generate a clock for the pattern generator by self-propagation using only the disk drive data heads requires several thousand steps during the servowriting of the disk surface. Since a single head cannot write and read simultaneously, self-propagation requires dividing a track on the disk into alternating sectors such that timing synchronization is obtained in one sector just prior to writing the next sector as shown in FIGS. 2a–2b. After moving the head to an initial starting track#0, trigger patterns (UP) are written on the even numbered sectors. The head is displaced a fraction of a track to servo track #1 and the even numbered sectors 2, 4, 6, . . . 60 are used for synchronization in writing the subsequent TP's on the odd numbered sectors 1, 3, 5, . . . 59. The head is again displaced a fraction of the track to servo track #2 and the roles are reversed, with the odd numbered sectors used for synchronization in writing the subsequent even numbered sectors. This process continues until the head is displaced across the recording surface. Each time a sector is written, a small but unavoidable timing error called the base error occurs due to both disk rotational velocity changes and electrical noise in the readback signal used for synchronization. These errors are replicated on the next step as the written sectors change over to synchronization sectors. A new and independent set of random errors is added here as well. Thus, the self-propagation process involves a replication and summation of the random errors in each step. Left uncorrected, statistically such errors grow as the root mean square of the number of steps. Since the process of synchronization and writing is causal, i.e. synchronization occurs before writing on each step, the sequence of random errors that determines the location of a given sector timing pattern can be traced back in a spiral path which is shown by the arrows labeled Path 1, Path2 and Path3. The paths run in parallel and for adjacent radial locations at each sector are totally independent so the track to track misalignment ends up as the difference between two independent random walks, giving an additional factor of the square root of 2. Therefore after 10,000 steps the RMS track to track error would be 141 times the base error. It should be noted that this process can work with other than alternating patterns limited to two, for instance three patterns may be used for clock propagation, but two is the presently contemplated preferred embodiment.

In a step prior to servowriting, timing or trigger patterns (TP) are placed on the disk. In terms of the errors, an example, after 4 steps, the total error in the TP location in sector #5 servo track#3 TP 26 equals the error from synchronizing off the TP 24 in sector #4 on servo track #2 plus that from the TP 22 in sector #3 on servo track #1 and that from the TP 20 on sector #2 on servo track #0 whereas the error in the TP 42 location in sector #5 servo track #1 equals the error from synchronizing off the TP 40 in sector #4 on servo track #0. Therefore, although TP 26 and TP 42 are on adjacent tracks, their errors originate from two independent paths labeled Path2 and Path3 which will cause a track to track misalignment.

There exist several proposed techniques to replace the clock head with a self propagated clock using only the disk drive head. Unfortunately, those proposed processes do not teach how to achieve the propagation without the uncontrolled growth of errors from track to track. The growth of these errors has thus far prevented the commercial application of all proposed methods for self clock generation due to the precise requirements for timing alignment in modern disk drives.

International Patent Application No. WO94/11864 and IBM Technical Disclosure Bulletin, Vol. 33, No. 5 (October 1990) do not teach how to propagate a clock pattern without the growth of errors. U.S. patent application, Ser. No. 08/028,044, filed on Mar. 8, 1993 as assigned to the assignee of this application, which is incorporated by reference, shows how errors in the pattern propagation process can be detected and corrected to produce precise magnetic pattern alignment from track to track. Errors written at each step are measured during a subsequent revolution of the disk and are accounted for and corrected. For example in FIG. 2 prior to writing TP 26, the interval between TP 24 and TP 42 is measured on an extra revolution of the disk and stored as a time interval T45. The time interval T45 is used when the head is positioned on servo track #3 and triggers on TP 24 to write TP 26 aligned to TP 42. The extra revolution of the disk breaks the causal chains denoted by Path 2 and Path 3, effectively locking together the normally independent random walk paths and preventing the growth of track to track misalignment. This process as described in U.S. patent application Ser. No. 08/028,044 will be referred to as the "dual revolution clock propagation process" within the following text.

It is understood that in writing a trigger pattern a specified time after a trigger one must account for the presence of electronic delays in the trigger and write circuitry as is taught in the IBM Technical Disclosure Bulletin, Vol. 33, No. 5 (October 1990) There the read/write delay is measured once and applied as a constant correction. The read/write delay can be determined prior to beginning the propagation by locating the head against a stop and writing a set of even numbered trigger patterns. The recording head triggers on each of the even numbered trigger patterns and writes an odd number trigger pattern at an initial delay setting D after each even numbered trigger pattern. On another revolution of the disk, the the time interval between each even numbered trigger pattern and its following odd numbered trigger pattern is measured and recorded. The average of these recorded values minus the initial delay setting D is the read/write delay correction that must be subtracted from all computed delay settings in order to properly compensate for the electronics delay.

However, patent application Ser. No. 08/028,044 and the IBM Technical Disclosure Bulletin, Vol. 33, No. 5 (October 1990) did not teach how to achieve optimum track to track trigger pattern alignment in the presence of systematic errors (constant for every sector) but which vary as a function of radial position in the propagation process. In particular patent application Ser. No. 08/028,044 does not teach:

1) How to eliminate a varying systematic error when the recording head has spatially separate read and write elements such as the case for magnetoresistive heads. This results in a read to write time delay which is radially dependent.

2) How to remove the varying systematic error due to a read element and write element which are non-parallel resulting in an error in the measurement of the time interval.

3) How to eliminate servo pattern rotation due to systematic errors by using a once per revolution clock index derived form the motor drive current waveform or any other sensor.

In addition the patent application Ser. No. 08/028,044 does not teach:

1) How to minimize the effect of velocity jitter without decreasing the interval size.

2) How to improve the control of intervals by using a new method designed for this purpose.

3) How to achieve track to track alignment without incurring an additional revolution of the disk.

SUMMARY OF THE INVENTION

In accordance with the invention there is provided, a method for determining separation between a read element and a write element of a head in a direct access storage device having a rotating disk. The method comprises the steps of determining a first read to write time delay with the head positioned at a first radius of the disk; determining a second read to write time delay with the head positioned at a second radius of the disk and computing the separation between the read element and the write element based on a difference between said first delay and said second delay, and speed of rotation of the disk. At least one of said steps of determining read to write time delay comprises the steps of writing a first trigger pattern with a write element; writing a second trigger pattern a nominal time T after triggering on said first trigger pattern; measuring the time interval between said first and said second trigger patterns; and computing a difference between said interval and the nominal time T. The delays are a function of skew angle between the head and the moving disk, and skew angle is also used in said step of computing. The method further comprising the steps of: computing delay times resulting from skew for successive radial positions of the head with respect to the disk as a function of said separation, the skew angle, and the rotational speed of the disk, and using said delay times to correct positioning of trigger patterns as a servo pattern is written on the disk.

The intention is also directed to a method for determining a value for systematic errors in the placement of data on a rotating storage medium by a head having separate read and write elements, said errors being due to geometric misalignment of said read element and said write element. The method comprising the steps of: measuring a first time interval between trigger patterns which are written with the head located at a given radial position on said disk, measuring a second time interval between a pair of trigger patterns the first of which is written with the head located at a first radial position the second of which is written with the head located at a second radial position, said first and second radial positions being separated by a distance sufficiently small to allow both first and second trigger patterns to be read by the head placed at a single radial position and sufficiently large to observe said systematic error. The method is combined with the steps of providing a servo pattern on the disk; and using the measurement of the systematic errors to correct position of trigger patterns used to write said servo pattern on the disk. The invention also is directed to a method for correcting for systematic errors in the writing of timing patterns on a rotating disk by a head in a disk drive, comprising the steps of: writing a first series of trigger patterns with the head at a first position on a first track of said disk; recording the time interval between a rotational index related to the rotational orientation of the disk and at least one trigger pattern on said first track; computing an index correction value from the deviation of the time interval which was recorded from a predetermined desired time interval; and using said index correction value to shift location of each trigger pattern written on a subsequent track.

This invention also contemplates a method for correcting for systematic errors in the writing of timing patterns on a rotating disk by a head in a disk drive, comprising the steps of: writing a first series of trigger patterns with the head on a first track of said disk; recording a first time interval between a rotational index related to the rotational orientation of the disk and at least one trigger pattern on said first track; writing a second series of trigger patterns with the head on a second track of said disk; recording a second time interval between a rotational index related to the rotational orientation of the disk and at least one trigger pattern on said second track; computing an index correction value from the difference between said first and second recorded time intervals; and using said index correction value to shift location of each trigger pattern written on a subsequent track. In accordance with another aspect of the invention a process for self servowriting a rotating disk in a disk drive including a head positioned for interaction with the disk, comprising the steps of: writing a first set of trigger patterns on a first track; determining a read to write time delay; determining an index correction value; determining at least one random error correction value; computing a set of delay values which are a function of said read to write time delay, said index correction value and said at least one random error correction value. triggering from said first set of trigger patterns and writing a second set of trigger patterns on a subsequent track using said delay values. In yet another aspect of the invention a process for self servowriting a rotating disk in a disk drive including a head positioned for interaction with the disk, comprises the steps of: determining a read to write time delay; writing a first set of trigger patterns on said first track; determining an index correction value; moving the head a fraction of a track width; writing a second set of trigger patterns; measuring first times between each first trigger pattern and a following second trigger pattern and measuring second times between each second trigger pattern and a following first trigger pattern; calculating an updated read to write time delay based on said first times; utilizing said second times to determine a deviation from a nominal interval time to compute random error correction delay values; updating the index correction value; computing a set of delay values to write trigger patterns on a subsequent track as a function of the updated read to write time delay, the index correction value and the random error correction values whereby the growth of random and systematic errors in placement of said trigger patterns is eliminated.

The invention may also be used to measure the disk velocity at a given time by following the steps of measuring time intervals between successive trigger patterns just prior to said given time; computing instantaneous disk velocity based on said time intervals; and writing a next trigger pattern after said given time at a delay time corrected for deviation of said instantaneous disk velocity from average disk velocity.

In accordance with still another aspect of the present invention a method for determining which trigger pattern of a first trigger pattern a second trigger pattern in a series of trigger patterns that define successive time intervals is misplaced, comprises the steps of: determining first time intervals between said first trigger pattern and at least one other trigger pattern; determining second time intervals between said second trigger pattern d and at least one other trigger pattern; and comparing the first and second time intervals to determine which of said first and second trigger patterns is misplaced.

A highly advantageous aspect of the present invention is a method for generating timing patterns for self servowriting of a rotating disk in a disk drive comprising the steps of: during a single revolution of said disk, placing timing patterns on a first track of said disk and determining random errors in placement of said timing patterns on said first track; computing correction values to compensate for said placement errors; writing timing patterns on a subsequent track of said disk with positions altered by said correction values, whereby errors in placement on said first track are not propagated to said subsequent track. The invention is also directed to a method for removing a systematic error which varies radially during a self servo writing of a disk drive having a rotating disk comprising the steps of: measuring the systematic error at a plurality of predetermined radial positions; and correcting for the systematic error as servo tracks are written at said radial positions by an amount determined in step a. so as to cancel the systematic error, whereby the servo pattern rotates with respect to the disk in a desired manner. The invention also includes a a disk drive comprising: a rotating disk therein, a head radially positioned by an actuator, and a self servo written timing pattern written on said disk; said pattern being written so that systematic errors are eliminated; whereby the servo pattern rotation matches the trajectory traced out by the head in its radial motion across the disk. The servo pattern may also be written so that random errors in the track to track alignment of the servo patterns are statistically constant in their root mean square value across at least a desired portion of the disk surface.

In yet another aspect of the invention a disk drive having a head with separate read and write elements, said head being for interacting with a rotating disk is directed to a method for determining radial position of the head with respect to the disk, comprising the steps of: ascertaining a relationship between radial position of the disk and skew angle between the head and the direction of motion of the disk relative to the head; ascertaining the separation between the read element and the write element; determining a first read to write delay with the head at a first radius; determining a second read to write delay with the head at an unknown radius; computing the unknown radius from said first read to write delay, said second read to write delay, said relationship and said separation between said elements.

BRIEF DESCRIPTION OF THE DRAWINGS

FIGS. 1a–1b illustrate a disk and a typical disk servo pattern.

FIGS. 4A–4B show how servo patterns are written with a dual revolution process.

FIG. 10 shows a method to remove the effects of spindle velocity jitter.

DETAILED DESCRIPTION OF THE PREFERRED EMBODIMENTS

SELF-SERVOWRITER OVERVIEW

Figure 3:
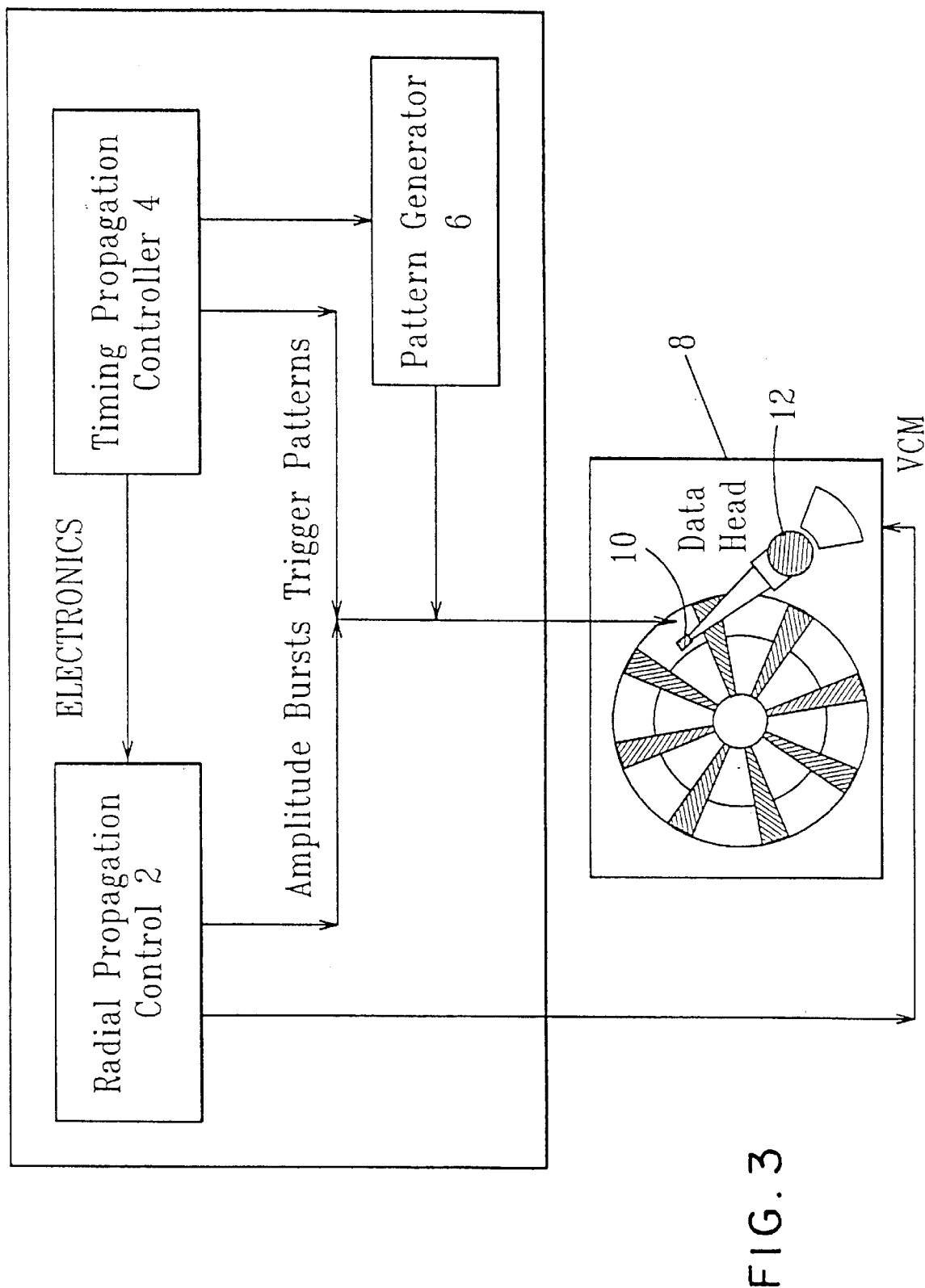
FIG. 3 shows the electronic servo pattern writer.

A system overview of the self servowrite apparatus is shown in FIG. 3. The system is comprised of electronic blocks including a radial propagation controller 2, a timing propagation controller 4 and a pattern generator 6. The system interfaces to the disk storage device 8 via the read/write transducer 10 and the actuator 12 which controls the position of the read/write transducer. Using only an electronic interface the self-servowrite apparatus can pattern the disk with servo information.

A commonly used servo architecture known as "embedded servo" in which servo pattern information is present on all disk surfaces is typically used in disk drives. The dual revolution clock propagation process described herein and in patent application Ser. No. 08/028,044 is used to gate the servo pattern generator 6 to write servo patterns onto all surfaces. The ability to accomplish this with a minimum of revolutions is important in the case when the servowriter is external to the disk drive which is contemplated to be the preferred commercial implementation of this invention.

Figure 4B:
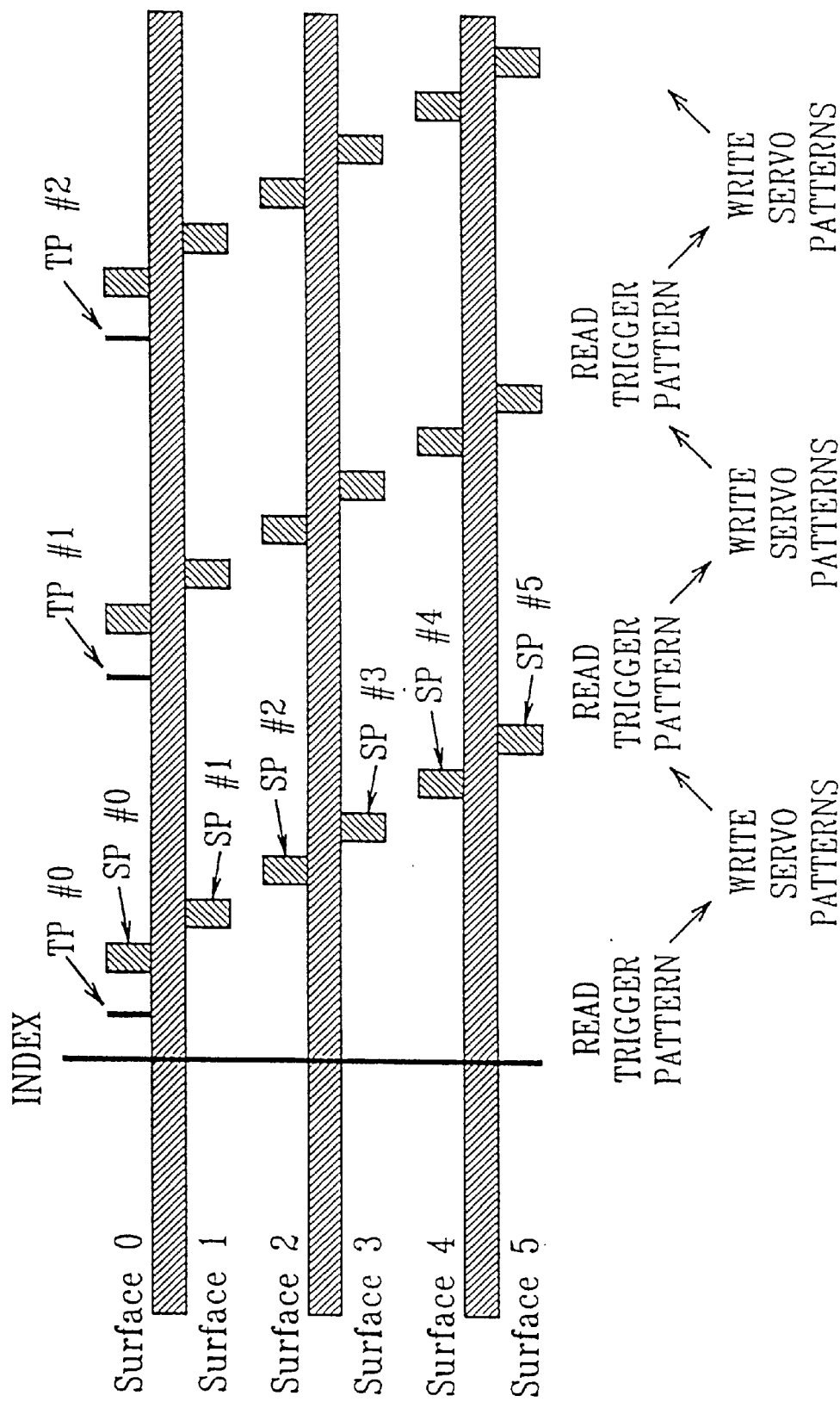

In FIGS. 4a–4b there is shown a process by which the trigger patterns are used to write servo patterns on a first surface using a first recording head and other surfaces by switching to other recording heads on other recording surfaces. The recording head is set to read mode and triggers on TP#1 which begins gating a pattern generator to write servo pattern SP#0, then the next recording head in the stack of a multiplatter disk drive is selected and a second servo pattern SP#1 is written on surface #1 and repeated to N surfaces. The number N is limited by the time required to write each surface and switch the heads. At the end of the Nth surface the head must be switched to the first surface #0 in time to read the next sector TP#2. This process makes clear the advantage of trigger patterns as their short time allows other surfaces to be written with servo patterns within a single revolution of the disk, thus reducing servo write time.

GEOMETRICAL EFFECTS RESULTING IN SYSTEMATIC ERRORS

All clock propagation processes require that systematic errors (which produce the same error on each sector of a servo track) are removed during the propagation process. Such errors contribute to track misalignment and/or rotation of the pattern with respect to a fixed frame. As previously described the most obvious systematic error as described in IBM Technical Disclosure Bulletin, Vol. 33, No. 5 (October 1990) is the electronic delay in the read to write circuitry. However, the prior art does not teach that varying systematic errors. (which change with radial position) due to geometric effects which are particular to a head and actuator design are present. If these errors are not compensated they will reduce the track to track accuracy of the propagation process and can accumulate to result in rotation of the pattern with respect to a fixed reference. This rotation is shown graphically in FIG. 8 where each TP on a subsequent servo track is displaced from the previous servo track due to a systematic error causing both pattern rotation and a fixed track to track misalignment error. In the case where the pattern rotation matches the trajectory of the actuator during a seek, no shift in timing relative to index related to the rotational orientation of the disk will be present. This is the desired pattern rotation since it simplifies the disk file servo during long seeks. Thus patterns which are written in such a manner as to have no timing shift relative to an index related to the rotational orientation of the disk will necessarily be of the desired type. Several examples of systematic errors are described below, but it should be understood that other similar effects can result from particular head and disk drive design. In general for a given systematic error there are three methods which can be used to remove these systematic errors 1) Measurement of the error at one or more known radii which are used to compute the correction term at each propagation step.

2) In-process correction of the error by internal measurements during the propagation process 3) Measurements of the error in the disk file, by external means, which are used to correct all disk drives of similar design.

RADIAL DEPENDENT TIME DELAY FOR INDEPENDENT READ/WRITE SENSORS

Figure 5A:
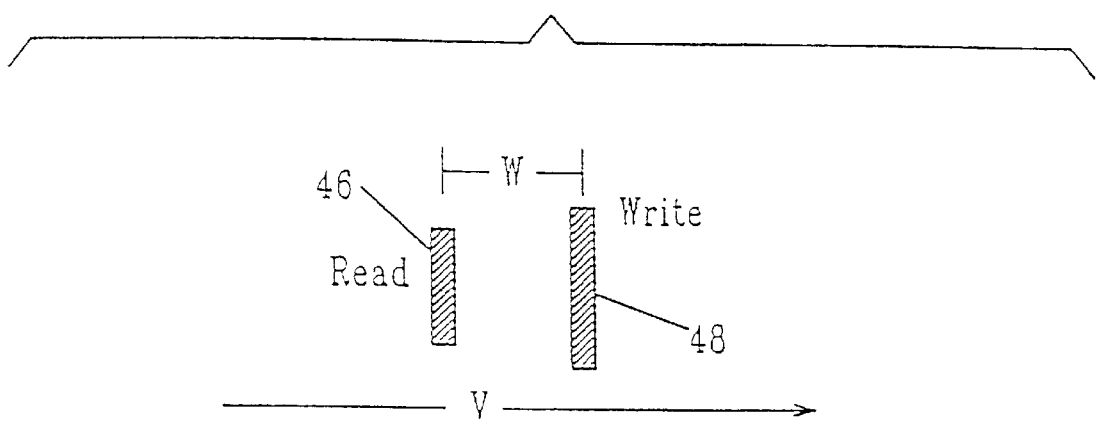
FIGS. 5a–5c show how the physical separation of read and write elements results in a time delay.
Figure 5B:
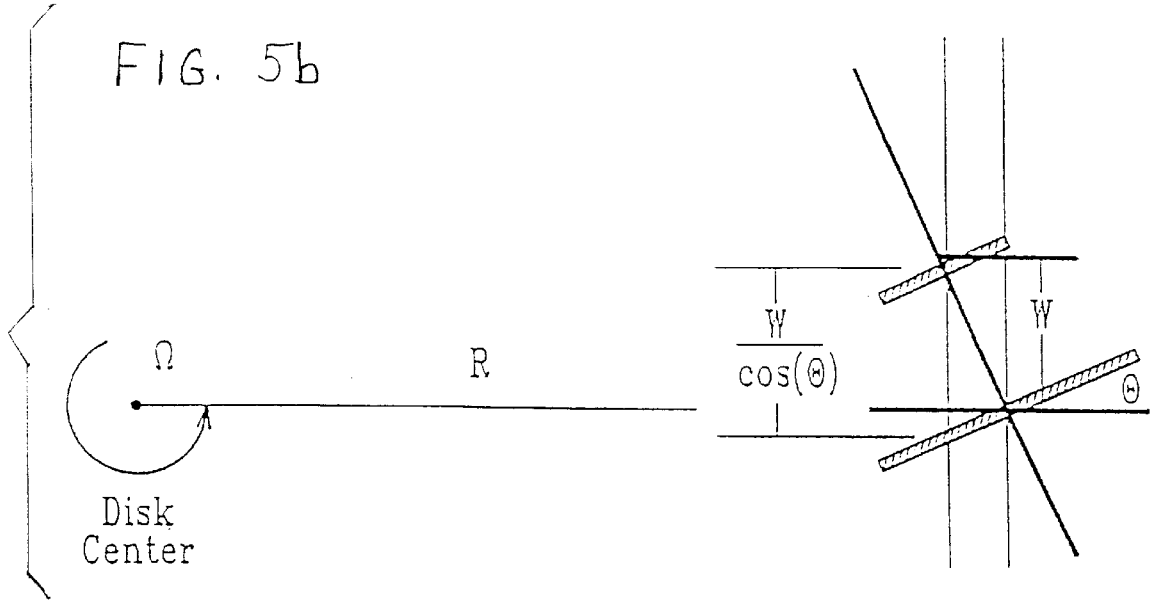

The dual revolution timing pattern process described in patent application Ser. No. 08/028,044 must be modified when the recording transducer has write and read elements which are separate as shown in FIG. 5a. In this case a time delay or advance (relative to the case where the write and read elements are not separate) is required to write a second trigger pattern a specified physical distance after a readback trigger pattern. This time delay is a function of the disk linear velocity given by W/V where W is the separation between the read element 46 and the write gap 48 and V is the disk linear velocity. Further, in the case where the head is skewed relative to the track as for example would occur on a rotary actuator the "apparent" separation W of the read and write transducers as projected along the recorded track is modified by the cosine of the skew angle of the recording head and will also vary as a function of radius (FIG. 5b). The time delay due to the separation effect is given by $$DELAY_{Separation} = \frac{W}{\cos(\Theta)\Omega R}$$

where $\Theta$ is the skew angle of the recording head, $\Omega$ is the disk rotation speed and R is the radius of the track.

Figure 5C:
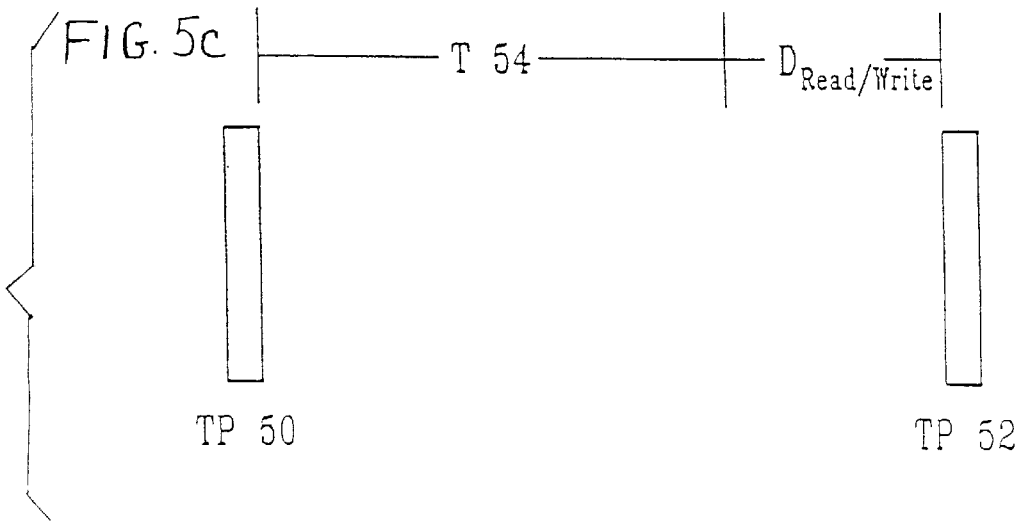

The read to write separation W can be measured using only the product data head by writing a TP 50, triggering on that trigger pattern on a subsequent revolution and writing a second trigger pattern TP 52, a time T 54 later (FIG. 5c). Subsequent measurement of the actual time between the two trigger patterns is equal to the time T 54 plus any delay in the electronics (which is fixed) and the delay due to the physical read to write separation W. Repeating this measurement at two known radii, possibly the innermost accessible data track or inner radius (ID) and the outermost accessible data track or outer radius (OD), with known skew angle can be used to compute the separation between the read and write elements. The measured total delay is given by:

$$R/W_{Delay1} = \frac{W}{\cos(\Theta_1)\Omega R_1} + Delay_{electronic}$$

$$R/W_{Delay2} = \frac{W}{\cos(\Theta_2)\Omega R_2} + Delay_{electronic}$$

where this total delay referred to as the read to write delay, includes a delay due to the read to write separation and an additional delay due to the electronics path in either or both the read and write chain of the recording head.

The above relationships can be solved for W as given by $$W = \Omega \times \left[ \frac{R/W_{Delay1} - R/W_{Delay2}}{\frac{1}{\cos(\Theta_1)R_1} - \frac{1}{\cos(\Theta_2)R_2}} \right]$$

The delay for each propagation step can then be computed and updated as the timing pattern is propagated across the disk surface.

Alternatively, as noted in method #2 the read to write delay can be measured during the propagation process and used to correct for the variable delay. For the case of the dual revolution timing pattern process a measurement of the delay and correction values is available on each readback measurement revolution which will be described in the section "Process with Systematic Error Removal" below.

In some cases it may be desirable to use the above method to find the absolute radial position of the head. For a given disk file the relationship between radial position of the head and the skew angle may be ascertained. Once the separation between the read and write elements is known, the electronic component of the delay may be determined by solving the above equation for the read to write delay at a given known radius. The same equation may now be solved to determine absolute radial position by using the read to write delay measured with the head at any other location.

READ TO WRITE NON-PARALLELISM

Figure 6A:
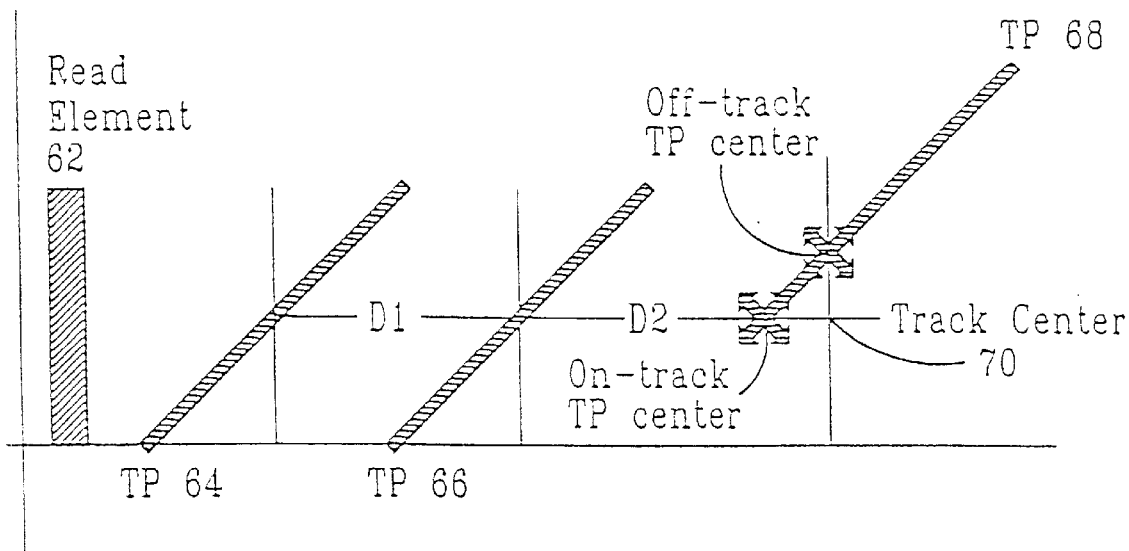
FIGS. 6a–6b show how a non-parallel read/write head results in an apparent shift of the trigger pattern when the head is moved off track center
Figure 6B:
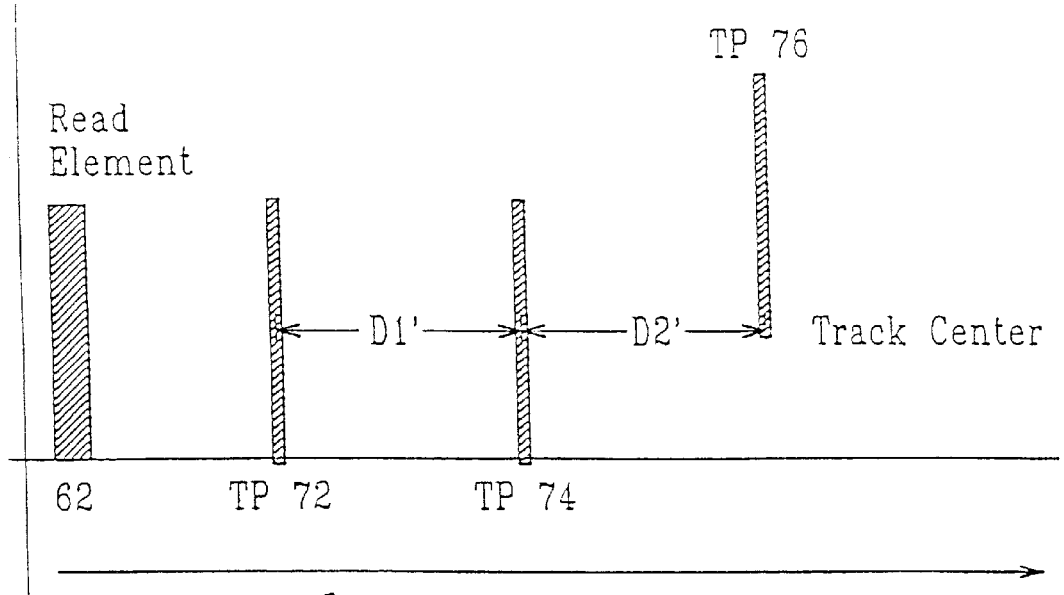

An additional systematic error occurs if the read element of a recording head is non-parallel to the writing element. This is shown in FIG. 6a where the written TP 64, TP 66, and TP 68 are non-parallel to the read element 62. TP 68 is written approximately one half off-track from TP 64 and TP 66. When the read element 62 on track center 70 reads the trigger patterns, the time interval measured between TP 64 and TP 66 is given by D1. The time interval measured between TP 66 and TP 68 is equal to D2. The time interval D2 will be longer than D1 due to the fact that TP 68 is off track and its angle results in a shift in the apparent center of the trigger pattern. To further clarify this effect, when the read and write elements are parallel as shown by TP 72, TP 74 and TP 76 (FIG. 6b) the measured intervals per the above description result in the two measured intervals D1' and D2' which are equal.

This error can be removed during the propagation process by measuring the systematic error of intervals comprised of both on-track trigger patterns versus those intervals with one on-track and one off-track signal and storing the value. If this measurement is performed at a known radius (most likely the ID or OD) then the shift S can be shown to be.

$$S = Delay \times \Omega \times R$$

With a measured value for S, the delay can be computed at any radial step.

Alternatively, as noted in method #2 this error can be measured during the propagation process, as a separate periodic measurement step. In particular in the case where the read and write elements have a more complex geometric misalignment rather than simply non-parallel, then the delay may depend non-linearly on radial location. Correction of the effect would require periodic measurement during the propagation process.

Figure 7A:
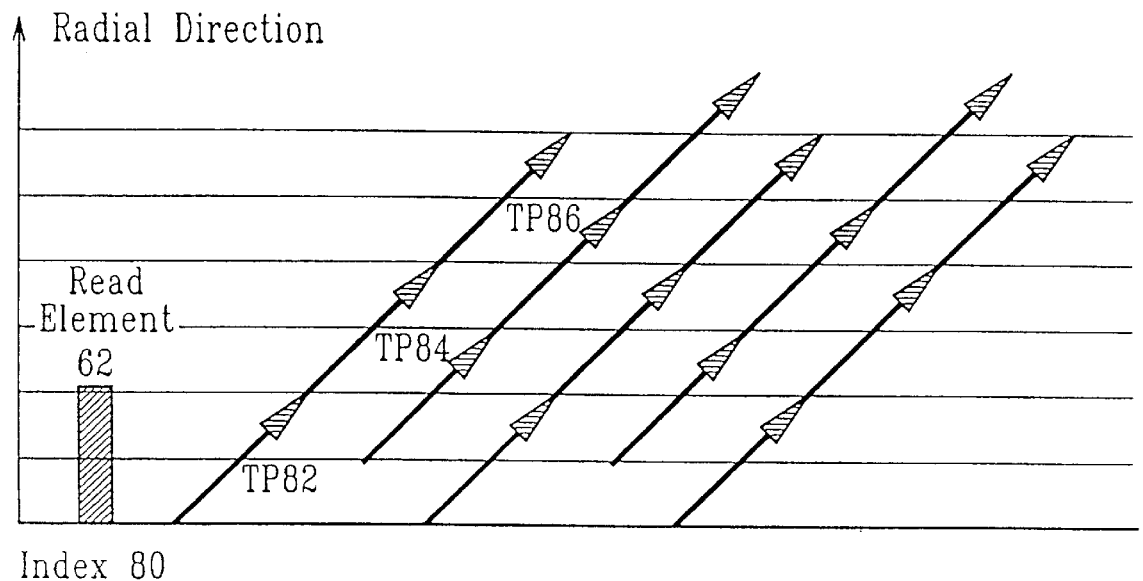
FIG. 7a shows non-parallel read and write elements resulting in pattern rotation.

An additional consequence of this geometric effect is to create a pattern spiral which is shown in FIG. 7A where the TP 82, TP 84 and TP 86 are aligned to minimize the track to track misalignment of the pattern, but the result is a rotation of the pattern from Index 80 in the time domain. As described above, this is not the desired pattern shape. It should be noted that any non-parallelism between the read element and the written transition will cause this effect and it need not be limited to a constant angle between the read and write elements. Specifically, a bending or warping of the written transitions arising from edge effects in the write process will produce this effect. The desired pattern shape can be restored by using a once per revolution index as described in the "Process With Systematic Error Removal" below. A unique feature of this read to write non-parallelism effect is that it results in both a track to track timing error and a pattern spiral error.

MISALIGNED HEAD MOUNTING

Figure 7B:
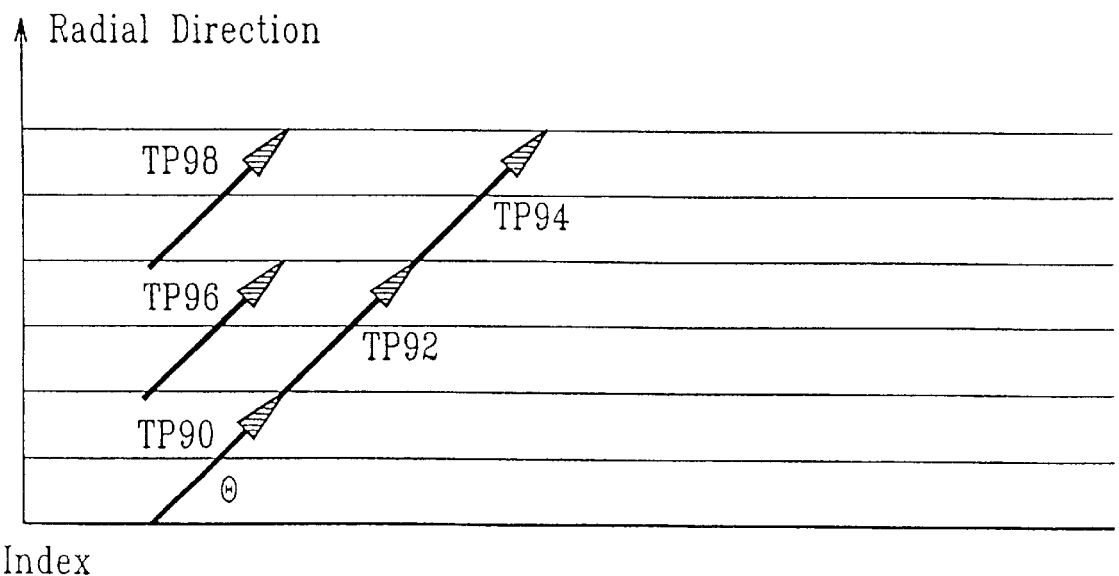
FIG. 7b shows a misaligned head mounting resulting in pattern rotation.

An additional geometric effect can occur if the recording head is non-parallel to the direction of actuator motion. When the trigger patterns are aligned to minimize the track to track error, a pattern rotation will result. A simple example is shown in FIG. 7B, in which a head is non-parallel to the motion of a linear actuator. When the trigger patterns TP 90, 92, 94 are aligned a pattern rotation occurs. Removing the pattern rotation shown by TP 90, 96 and 98 results in a track to track misalignment. A similar effect occurs when a head is misaligned on a rotary actuator. Note that, unlike the read to write non-parallelism effect, misaligned head mounting produces only a pattern spiral error. There is no track to track timing error from this effect.

PROCESS WITH SYSTEMATIC ERROR REMOVAL

Figure 2A:
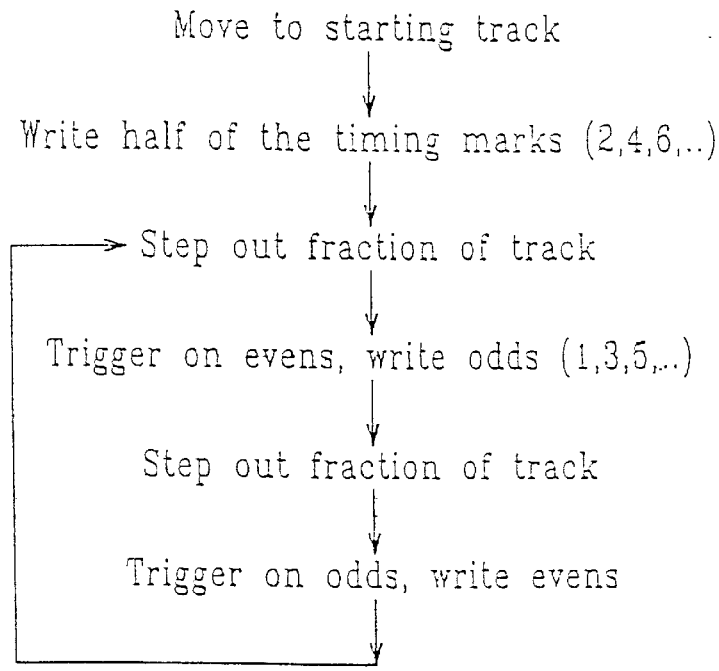
FIGS. 2a–2b show how independent casual paths of pattern propagation are generated and can be eliminated by measuring and by using an additional revolution of the disk.
Figure 2B:
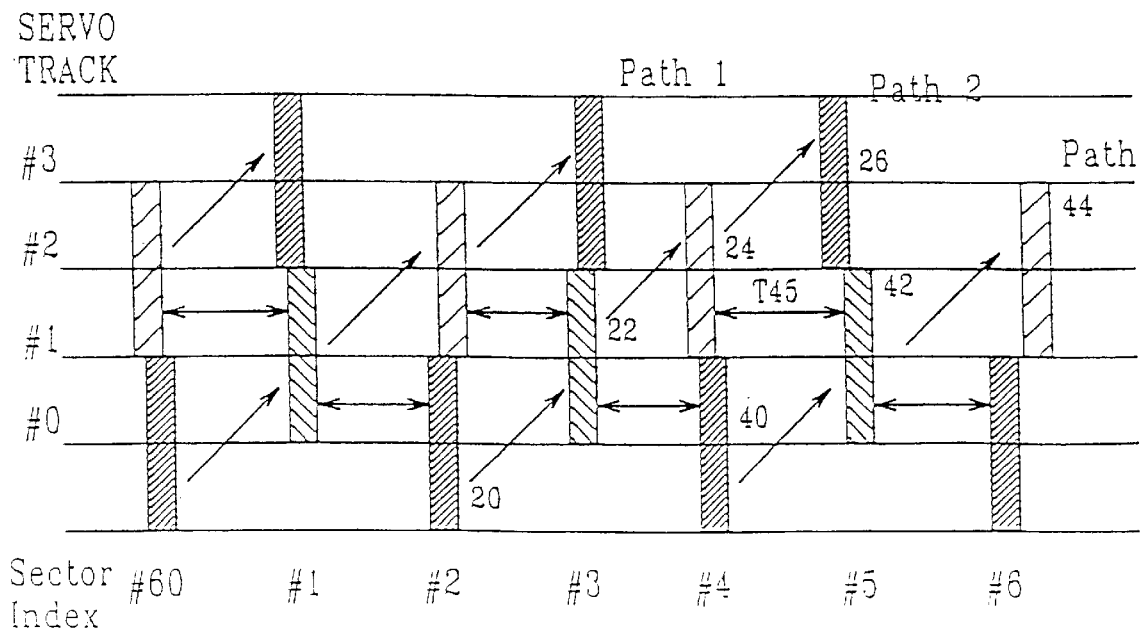
Figure 8:
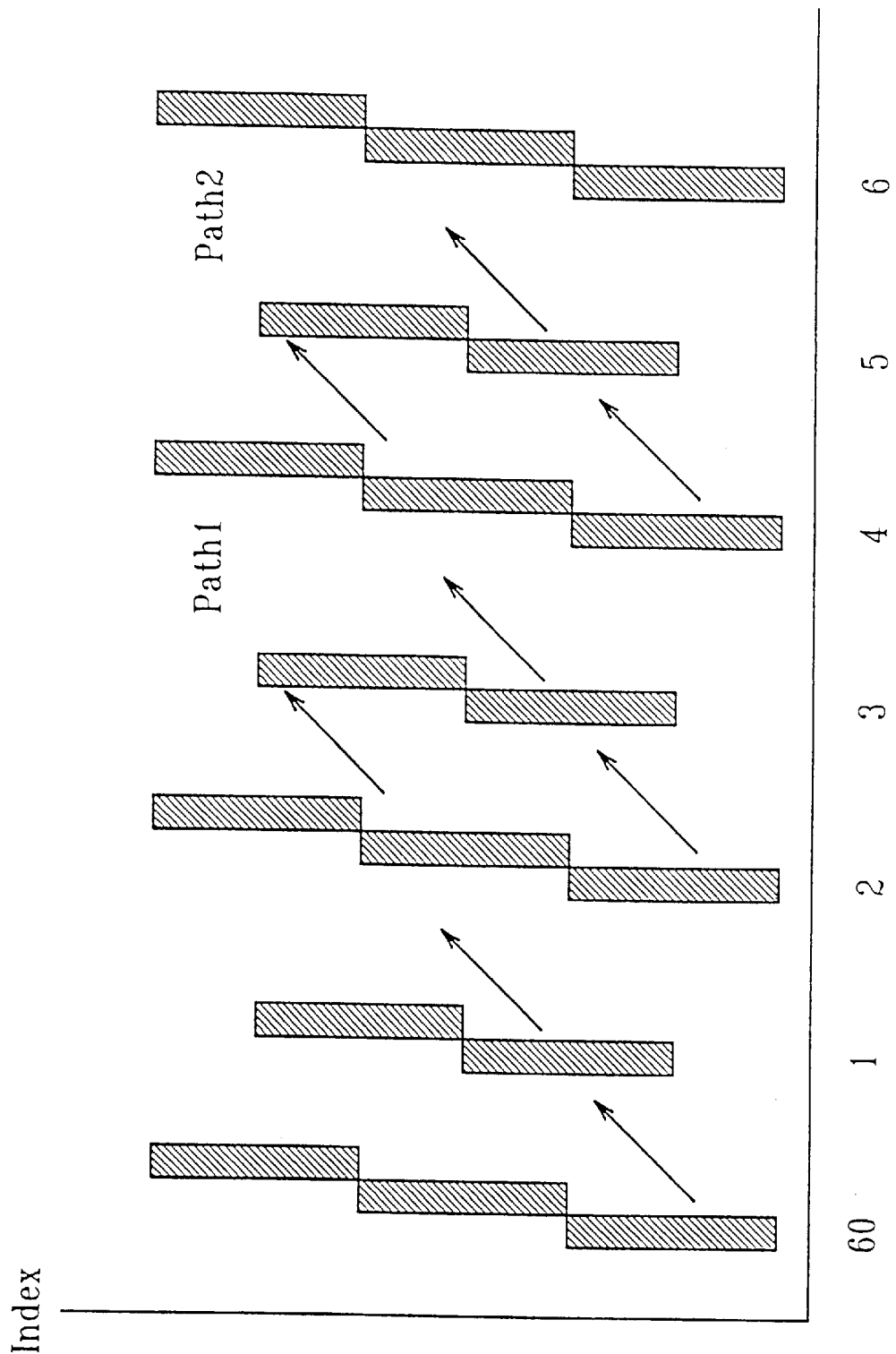
FIG. 8 shows the effect of systematic errors on pattern propagation.

In the propagation process shown in FIGS. 2a–2b the odd numbered sectors are used for synchronization in writing the subsequent even numbered sectors and on the next step (after moving the head a short distance radially), the roles are reversed, with the even numbered sectors used for synchronization in writing the subsequent odd numbered sectors. Although the growth of random errors is removed by the measurement feedback process, any systematic error will result in a fixed track to track error and in a rotation of the entire servo pattern with respect to a fixed reference frame. This is shown in FIG. 8 where subsequent written TPs are displaced a fixed distance from the previous servo track due to a systematic error.

Figure 9:
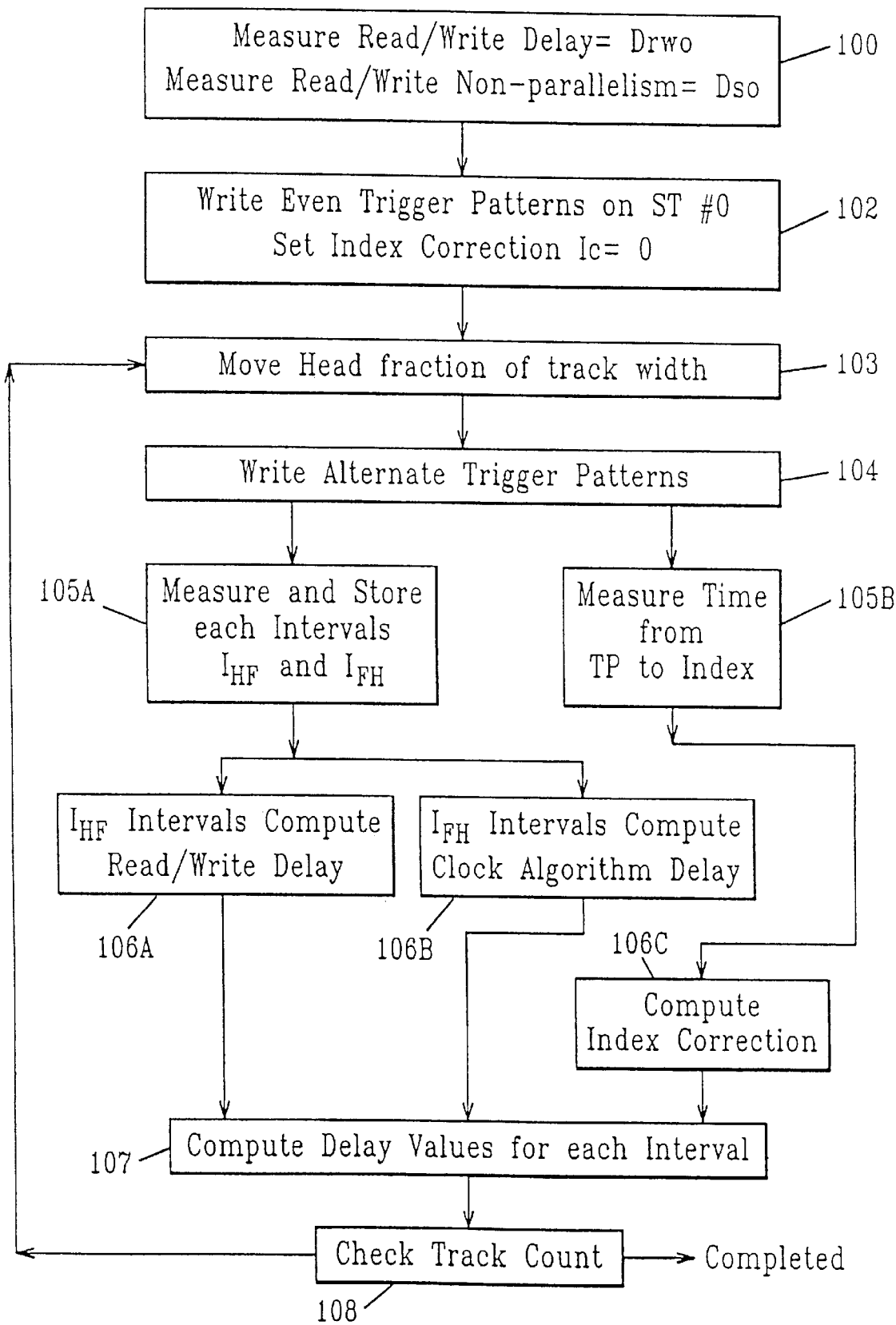
FIG. 9 shows a process to remove systematic error and eliminate pattern rotation.

A flow chart by which the systematic error is removed as well as random errors are removed in the pattern propagation process is shown in FIG. 9. A detailed description of the process is given below.

STEP 100) The process in initiated by writing a sequence of TPs and measuring the delay between read and write as previously described and storing the delay as a variable $D_{RWO}$. The TP shift due to read/write parallelism is checked and measured and stored as $D_{SO}$.

STEP 102) The read to write delay determined from STEP 1 is used to write the even numbered TPs on the disk. The location of the first TP with respect to index is recorded and the index correction is set to zero.

STEP 103) The head is moved a fraction of the track width.

STEP 104) The alternate numbered TPs are written. This is initially the odd TPs but will alternate between even and odd on successive propagation steps.

STEPS 105) Every interval corresponding to the time between TP is measured.

At STEP 105A, the intervals are divided into two groups $I_{FH}$ and $I_{HF}$. The $I_{FH}$ correspond to a time interval beginning with a full on-track TP and ending with an off-track TP. The $I_{HF}$ corresponds to a time interval beginning with an off-track TP and ending with an on-track TP. Combined these account for all the intervals on the disk.

At Step 105B, the location of the first TP in the group written is recorded during the same revolution of the disk.

STEPS 106) The measured intervals are used to calculate the time delay corrections.

At STEP 106A, the $I_{HF}$ are used to determine the read to write delay to be used in the next TP write.

At STEP 106B, the $I_{FH}$ are input to the clock algorithm an corrections are computed to eliminate the random growth of errors in the next TP write.

At STEP 106C, the location of the first TP to the index is used to compute a new index correction to prevent the rotation of the pattern with respect to index. It should be noted this feature may be disabled for example to minimize track to track error by allowing the pattern to rotate as in FIG. 7. The index can be obtained from the current waveform in the DC brushless motor typically used in disk drives or from any other available once-per-revolution signal.

STEP 107) The outputs of each of the above described processes in STEPS 106A, 106B and 106C are used to compute the desired delay to write the alternate TPs at the next radial location.

STEP 108) The track count is checked to determine the end of the process.

The process then loops back to STEP 103.

In the above process in practice one may average the measurements of the systematic errors on two or more subsequent steps prior to making corrections to the computed delay values for each interval.

VELOCITY ERROR CORRECTION

Variations in the disk rotation speed will cause errors in the propagation process described above. In the patent application Ser. No. 08/028,044 it was taught that the magnitude of this error is proportional to the interval spacing. Therefore this error can be minimized by reducing the interval size which corresponds to the time between any two consecutive odd (or any two consecutive even) trigger patterns until this term is negligible. In certain cases the reduction of the interval to reduce this error to a negligible level may not be practical.

In those cases where intervals can not be reduced we disclose a new method in which the velocity of the disk is measured "on the fly". Errors in the written TP location will occur when the velocity of the disk is different during the read and the write step as in the dual revolution timing pattern propagation of patent application Ser. No. 08/028, 044. In this process the nominal interval length corresponding to the average of the interval times (either or both readback and write interval times) for one complete rotation is used to estimate the disk average or nominal velocity. As shown in FIG. 10, by measuring the time interval between the TPs during the write process, an estimate of the local disk velocity can be obtained by comparing this interval with the nominal interval at the nominal velocity. As the rate of change of velocity is limited by the disk inertia, a set of interval measurements immediately preceding the TP to be written may be averaged to estimate the current disk velocity. For example when the head is centered on servo track #1, intervals T 114 and T 116 can be measured to estimate the local disk velocity prior to writing TP 118.

METHOD FOR IMPROVED INTERVAL CONTROL

Figure 11A:
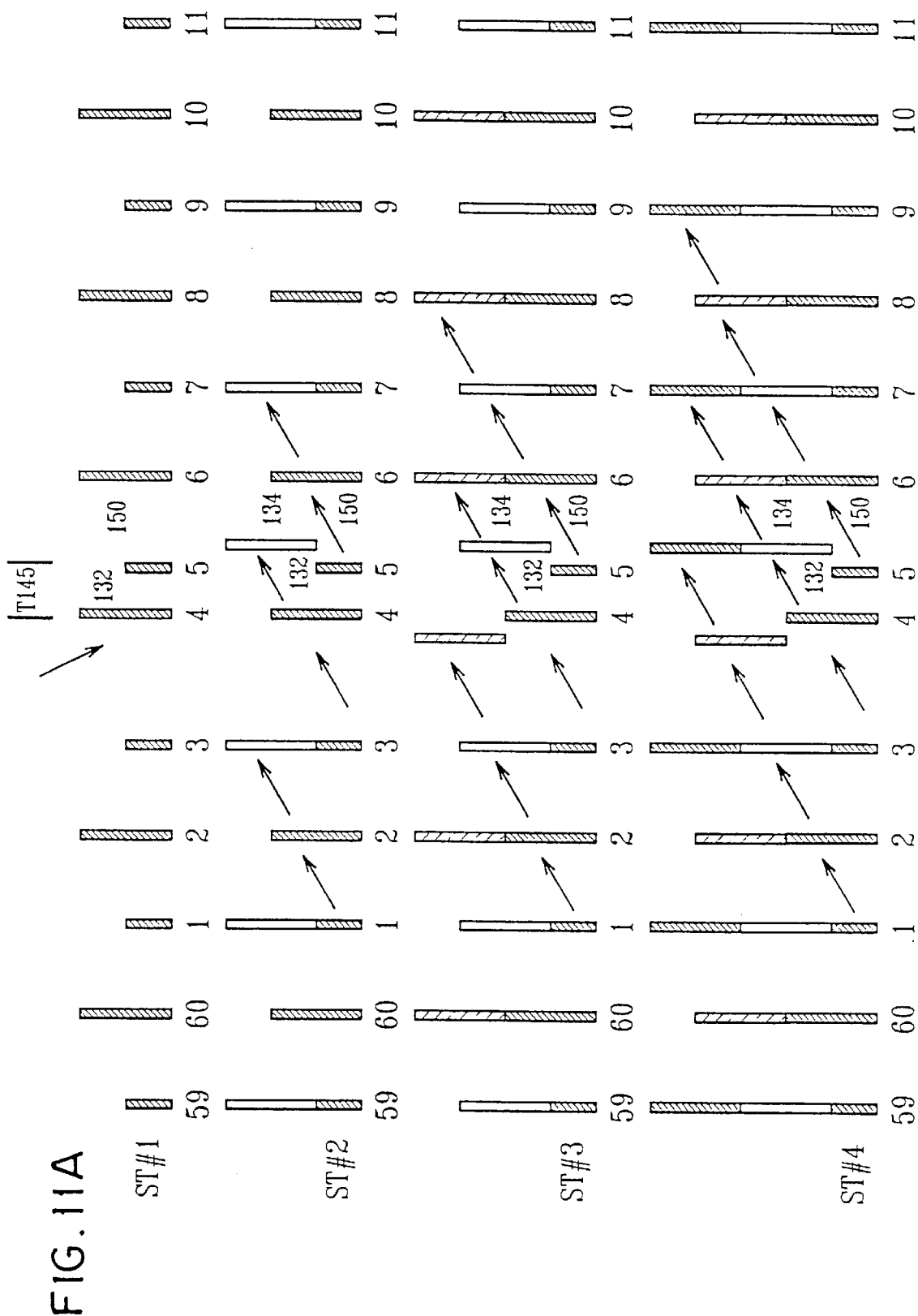
FIGS. 11A–11B show a method of clock propagation with reduced interval jitter.

The previously disclosed method of patent application Ser. No. 08/028,044 employs interval measurements during the trigger pattern propagation. When an error occurs in an interval it is unknown which of the two TPs defining the interval is erroneously positioned. As a result, when the method propagates with correction values of F (F is defined below) less than 1, the TP location errors propagate (in a decaying fashion) to neighboring locations. A demonstration of this is diagrammed in the FIG. 11a, On servo track #1 TP 150 is erroneously shifted with respect to TP 132 resulting in an interval measurement T 145 less than the nominal. On the next step of the process the head is positioned on servo track #2 and TP 134 is written with an error to correct for the short interval T 145. Subsequent writing of servo tracks #3 and #4 shows that the error propagates in a decaying fashion.

In the method for improved interval control information about the position of a particular TP is extracted. Rather than specifying a particular interval from the previous TP as the desired nominal position, the interval data from surrounding TPs are used to provide position information. The interval between the TPs currently being evaluated and each TP within a specified number of transitions is computed.

Figure 11B:
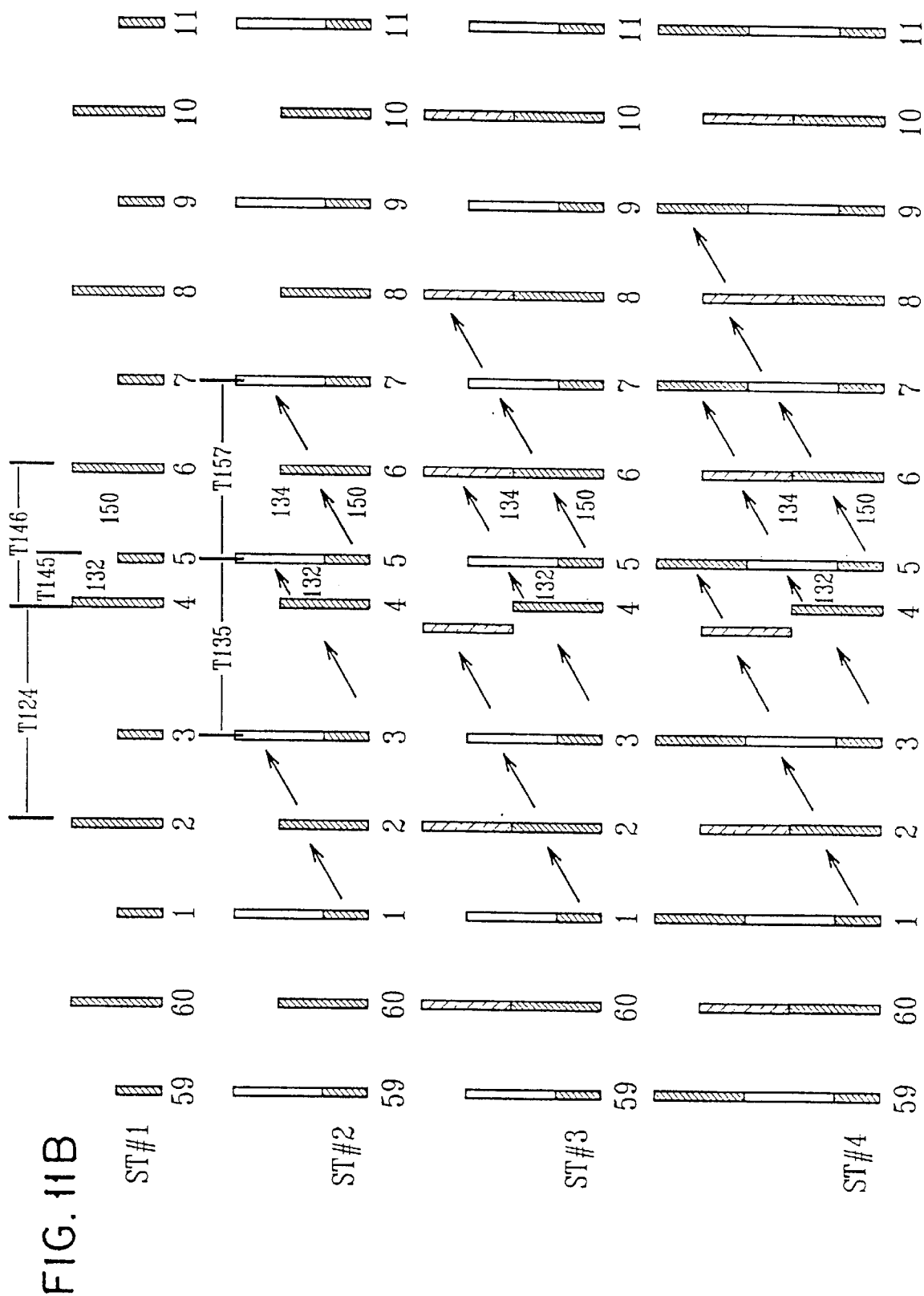

As an example of using the nearest neighbor comparison the location of TP 150 is evaluated by measuring the interval T 135 and T 157 (FIG. 11*b*). Similarly TP 132 is evaluated by measuring T 124 and T 146. In the case where T 124 and T 146 are not equal, and T 135 and T 157 are equal then the location of TP 150 is in error and not that of TP 132. In actual practice this process is extended beyond nearest neighbors and averaged for an appropriate specified number of neighboring intervals to provide information on TP placement.

SINGLE REVOLUTION TIMING PATTERN

Timing information in the form of equally spaced trigger patterns (which consist of one or more written magnetic transitions) at one radial position on a disk surface can be propagated over the entire disk radius without incurring a growth in the track to track alignment of the timing information. This process is further accomplished within a single revolution per servo track, thereby adding no additional time to the process of servowriting the disk drive. The importance of this advance is critical for cases where the self-generation process occurs external to the disk drive and where additional rotations of the storage media directly impact the number of servowriter systems required. For example a timing pattern which required two revolutions of the rotating storage media and one additional revolution to move the recording head to the next servo track location would require 50% more servowriters than the method described above. This can represent a large capital cost, when the servowriter is external to the storage device.

Figure 12:
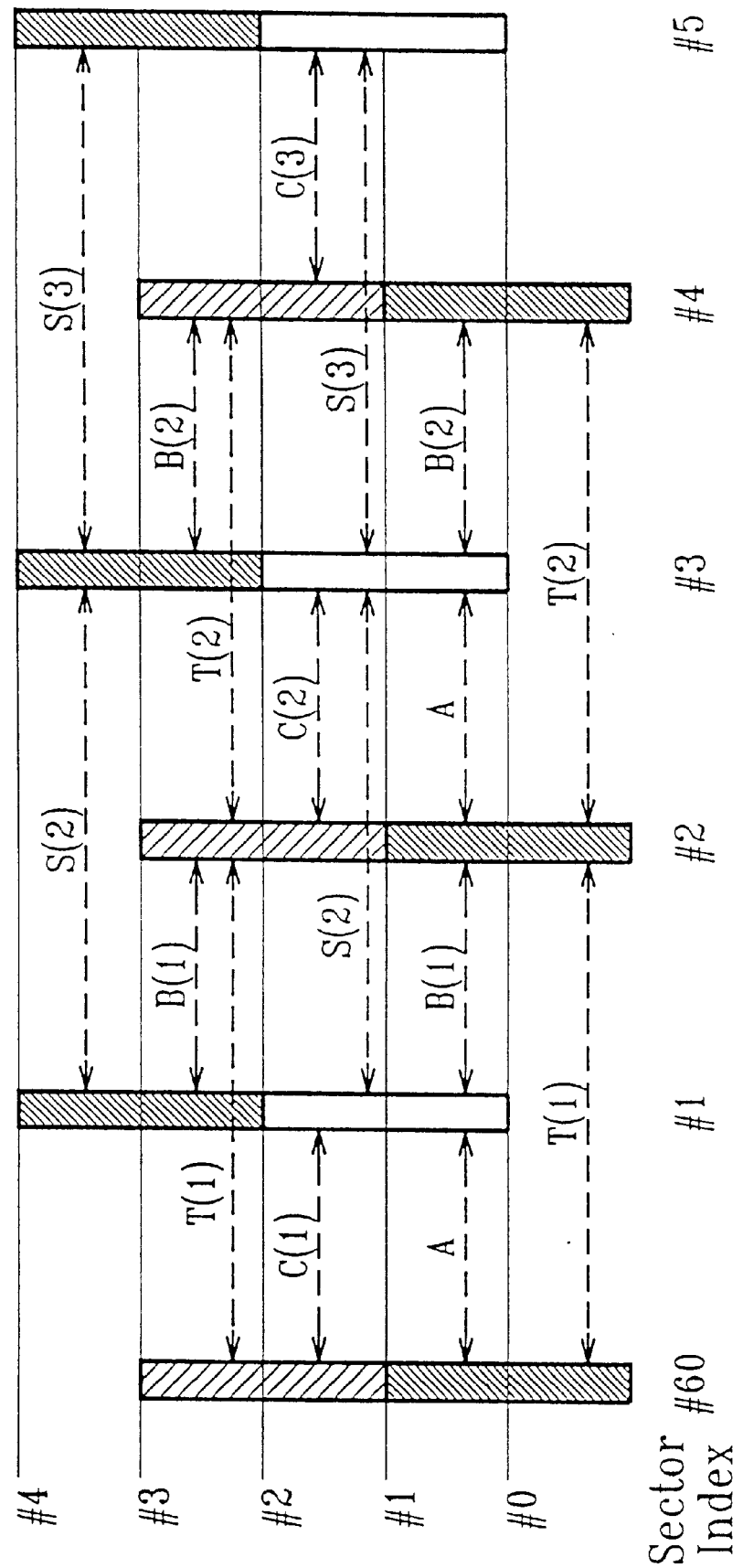
FIG. 12 shows a method of clock propagation without incurring an additional revolution of the disk.

The process of self-propagation of a timing pattern is described in the steps below and is shown in FIG. 12. In this example A is equal to one half the interval T, but in general A can be any fraction of T.

1. A recording head is located on servo track location #0 and writes a series of even number trigger patterns corresponding to every other sector on the disk surface, with a nominal interval size T.

2. The recording head is servo-positioned to servo track location #1.

3. The recording head triggers on each of the N even numbered trigger patterns and writes an odd number trigger pattern at a time A following each even numbered trigger pattern. During this write sequence the time interval between every two adjacent even numbered trigger patterns is measured and recorded in a computer memory as the values T(n), where n runs from 1 to N.

4. The intervals B(n), are computed from the stored time intervals and the interval A given by B(n)=F*{T(n)−A}+{1−F}*A.

5. The recording head is servo-positioned to the next servo track location.

6. The recording head triggers on each of the N odd numbered trigger patterns and writes an even number trigger pattern at a time B(n) after each of the even numbered trigger pattern. During this write sequence the time interval between every two adjacent even numbered trigger pattern is measured and recorded in a computer memory as the values S(n).

7. The intervals C(n), are computed from the stored time intervals and the intervals B(n) given by C(n)=F*{S(n)−B(n−1)}+{1−F}*A.

8. The recording head is servo-positioned to the next servo track location.

9. The recording head triggers on each of the N even numbered trigger patterns and writes an odd number trigger pattern at a time C(n) after each of the even numbered trigger pattern. During this write sequence the time interval between every two adjacent even numbered trigger patterns is measured and recorded in a computer memory as the values T(n).

10. The intervals B(n), are computed from the stored time intervals and the intervals C(n) given by B(n)=F*{T(n)−C(n)}+{1−F}*A.

11. Proceed to process step # 5 and repeat steps #5–#10 until the entire disk surface is filled with clock information.

F is a number from 0 to 1 which represent the weighting factor used to correct track to track misalignment. For example when F=1, the track to track misalignment error is minimized, but the absolute interval will deviate from the nominal value. When F=0 the nominal interval size is maintained but track to track errors will grow unbounded.

It is understood that in addition to the above process to remove random error growth, one must measure and correct for all systematic delays due to both electronic and geometric effects as described earlier. In addition the methods previously described of "Improved Algorithm for Interval Control" can similarly be applied to this process.

Figure 13:
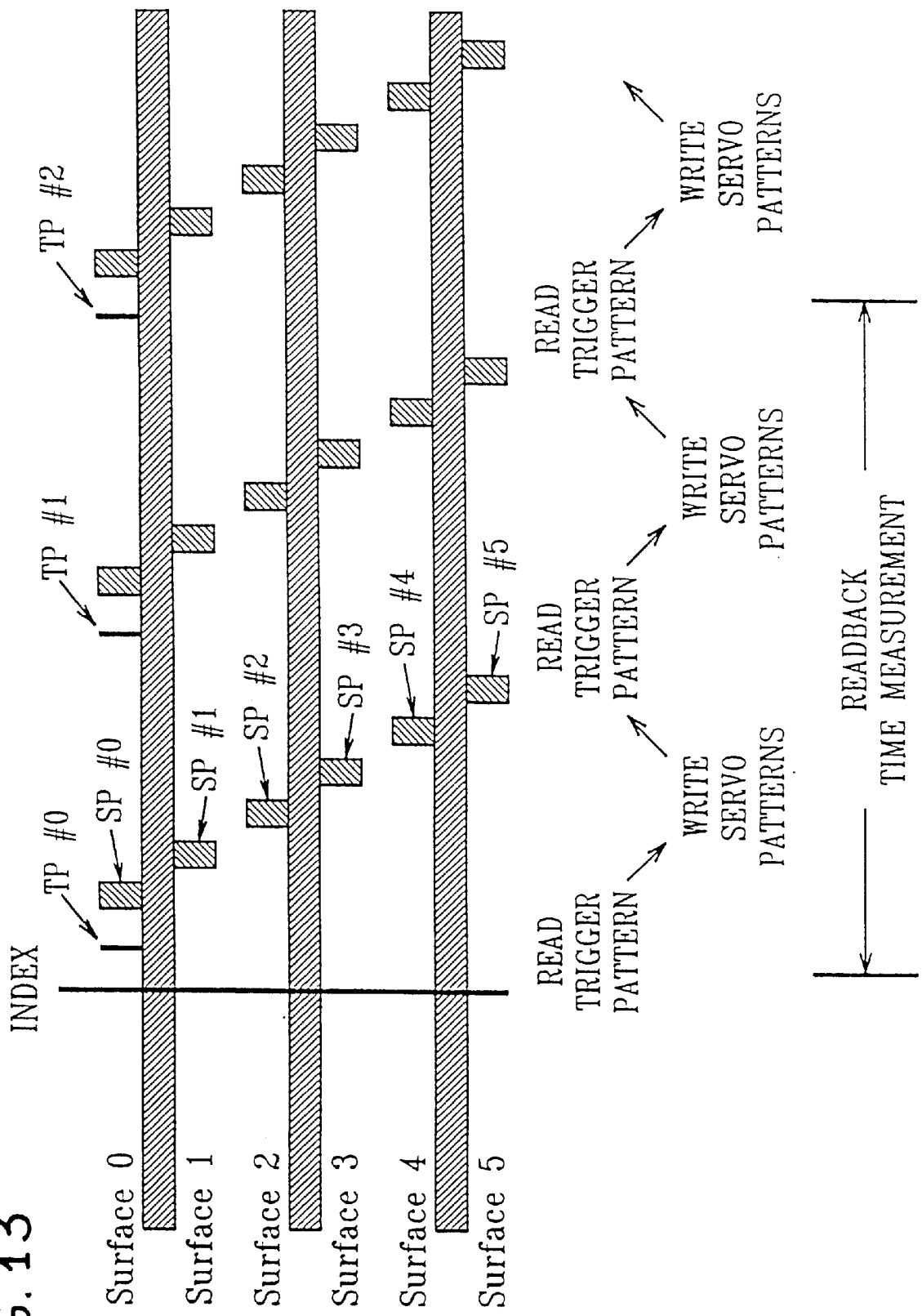
FIG. 13 shows how servo patterns are written with the single revolution clock propagation process.

The propagation of servo patterns using this clock propagation process is shown in FIG. 13. The recording head is set to read mode and triggers on TP 0 which begins gating a pattern generator to write servo pattern #0, then the next recording head in the stack is selected and a second servo pattern #1 is written on surface #1 and repeated to N surfaces. The number N is limited by the time required to write each surface and the head switch time. At the end of the Nth surface the head must be switched to the first surface #0 in time to write the next sector TP 1.

What is claimed is:

1. A method for determining values for systematic errors, said method comprising:

measuring a first time interval between a first trigger pattern and a second trigger pattern, wherein said first trigger pattern and said second trigger pattern are written on a storage medium with a recording transducer located at a first radial position of said storage medium;

measuring a second time interval between said second trigger pattern and a third trigger pattern, wherein said third trigger pattern is written on said storage medium with said recording transducer located at a second radial position of said storage medium, said first radial position and said second radial position being different radial positions; and comparing said first time interval and said second time interval to determine a value of a systematic error.

2. The method of claim 1, wherein said first radial position and said second radial position are separated by a distance sufficiently small to allow reading of said second trigger pattern and said third trigger pattern by said recording transducer placed at a single radial position.

3. The method of claim 2, wherein said distance is sufficiently large to observe said systematic error.

4. The method of claim 1, wherein said measuring a first time interval and measuring a second time interval are performed using said recording transducer at a given radius with respect to said storage medium.

5. The method of claim 1, wherein said recording transducer comprises a read element and a separate write element.

6. The method of claim 5, wherein said systematic error is due to non-parallelism of said read element and said write element.

7. The method of claim 1, wherein said systematic error is due to at least one of the following:
   (a) said recording transducer being non-parallel to a direction of motion of said recording transducer;
   (b) one or more of said first trigger pattern, said second trigger pattern, and said third trigger pattern has a curvature; and
   (c) a shift in the off center measured location of one trigger pattern of said first trigger pattern, said second trigger pattern, and said third trigger pattern with respect to a centered measured location of said one trigger pattern.

8. The method of claim 1, further comprising using said value of said systematic error to correct position of one or more trigger patterns subsequently written on said storage medium.

9. The method of claim 1, further comprising determining one or more values of systematic errors at one or more additional radial positions of said storage medium.

10. The method of claim 9, further comprising using said one or more values to determine values for systematic errors at every radial position.

11. The method of claim 1, further comprising correcting for said systematic error.

12. An apparatus for determining values for systematic errors, said apparatus comprising:
   means for measuring a first time interval between a first trigger pattern and a second trigger pattern, wherein said first trigger pattern and said second trigger pattern are written on a storage medium with a recording transducer located at a first radial position of said storage medium;
   means for measuring a second time interval between said second trigger pattern and a third trigger pattern, wherein said third trigger pattern is written on said storage medium with said recording transducer located at a second radial position of said storage medium, said first radial position and said second radial position being different radial positions; and
   means for comparing said first time interval and said second time interval to determine a value of a systematic error.

13. The apparatus of claim 12, wherein said first radial position and said second radial position are separated by a distance sufficiently small to allow reading of said second trigger pattern and said third trigger pattern by said recording transducer placed at a single radial position.

14. The apparatus of claim 13, wherein said distance is sufficiently large to observe said systematic error.

15. The apparatus of claim 12, wherein said measuring a first time interval and measuring a second time interval are performed using said recording transducer at a given radius with respect to said storage medium.

16. The apparatus of claim 12, wherein said recording transducer comprises a read element and a separate write element.

17. The apparatus of claim 16, wherein said systematic error is due to non-parallelism of said read element and said write element.

18. The apparatus of claim 12, wherein said systematic error is due to at least one of the following:
   (a) said recording transducer being non-parallel to a direction of motion of said recording transducer;
   (b) one or more of said first trigger pattern, said second trigger pattern, and said third trigger pattern has a curvature; and
   (c) a shift in the off center measured location of one trigger pattern of said first trigger pattern, said second trigger pattern, and said third trigger pattern with respect to a centered measured location of said one trigger pattern.

19. The apparatus of claim 12, further comprising means for using said value of said systematic error to correct position of one or more trigger patterns subsequently written on said storage medium.

20. The apparatus of claim 12, further comprising means for determining one or more values of systematic errors at one or more additional radial positions of said storage medium.

21. The apparatus of claim 20, further comprising means for using said one or more values to determine values for systematic errors at every radial position.

22. The apparatus of claim 12, further comprising means for correcting for said systematic error.

* * * * *